United States Patent
Sporbeck

(10) Patent No.: US 10,002,739 B2
(45) Date of Patent: Jun. 19, 2018

(54) X-RAY EMITTER

(71) Applicant: SIEMENS HEALTHCARE GMBH, Erlangen (DE)

(72) Inventor: Thorsten Sporbeck, Erlangen (DE)

(73) Assignee: Siemens Healthcare GmbH, Erlangen (DE)

( * ) Notice: Subject to any disclaimer, the term of this patent is extended or adjusted under 35 U.S.C. 154(b) by 0 days. days.

(21) Appl. No.: 15/790,284

(22) Filed: Oct. 23, 2017

(65) Prior Publication Data

US 2018/0114669 A1    Apr. 26, 2018

(30) Foreign Application Priority Data

Oct. 21, 2016  (DE) .......... 10 2016 220 748

(51) Int. Cl.
*H01J 35/00* (2006.01)
*H01J 35/10* (2006.01)

(52) U.S. Cl.
CPC ..... *H01J 35/101* (2013.01); *H01J 2235/1046* (2013.01)

(58) Field of Classification Search
CPC .............. H01J 35/101; H01J 2235/1046
See application file for complete search history.

(56) References Cited

U.S. PATENT DOCUMENTS

| 4,811,375 A | * | 3/1989 | Klostermann | ........ H01J 35/101 378/121 |
| 5,602,898 A | * | 2/1997 | Vetter | ................... F16C 17/107 378/132 |

FOREIGN PATENT DOCUMENTS

| DE | 2527709 A1 | 12/1976 |
| DE | 4111542 C2 | 5/2002 |
| DE | 102009048460 A1 | 5/2011 |

* cited by examiner

*Primary Examiner* — Dani Fox
(74) *Attorney, Agent, or Firm* — Laurence Greenberg; Werner Stemer; Ralph Locher

(57) ABSTRACT

An X-ray emitter has a rotating anode rotatably mounted inside an X-ray tube by way of a multi-sliding surface bearing. The multi-sliding surface bearing has an inner and an outer sliding surface which are mounted so they can rotate relative to each other about an axis of rotation such that a gap is formed between the inner and outer sliding surfaces. A contour of the inner sliding surface, in a plane running perpendicular to the axis of rotation, is formed at least in certain sections by arc-shaped segments which are each centered around center points that are offset from each other.

8 Claims, 3 Drawing Sheets

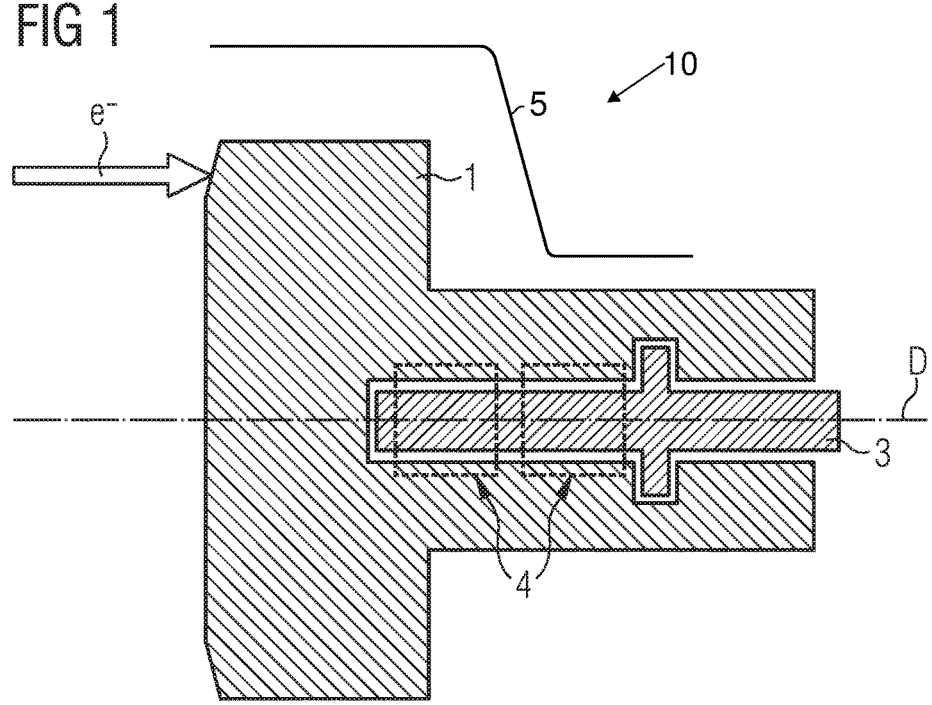
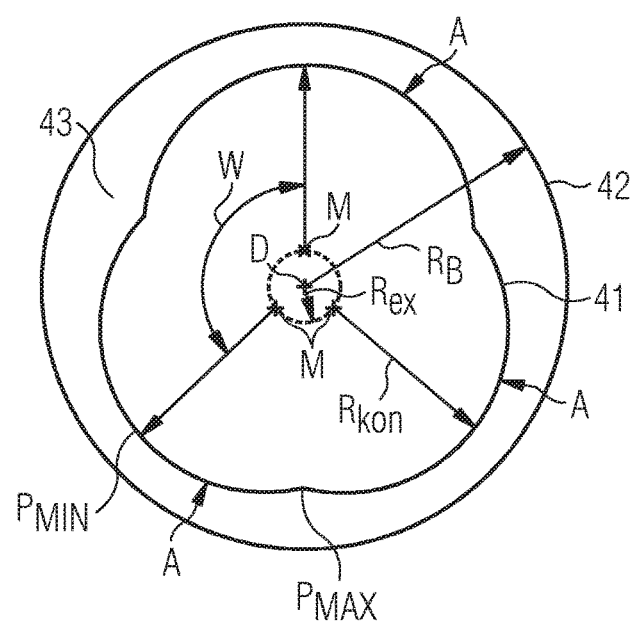

X-RAY EMITTER

CROSS-REFERENCE TO APPLICATION

This application claims the benefit, under 35 U.S.C. § 119, of German patent application DE 10 2016 220 748.2, filed Oct. 21, 2016; the prior application is herewith incorporated by reference in its entirety.

BACKGROUND OF THE INVENTION

Field of the Invention

The invention relates to an X-ray emitter having a rotating anode rotatably mounted inside an X-ray tube by means of a sliding bearing. The sliding bearing has an inner and an outer sliding surface which are mounted so they can rotate relative to each other about an axis of rotation in such a way that a gap is formed between the inner and outer sliding surfaces.

From the prior art X-ray emitters having rotating anodes are known which are offset in rotation during operation in order to distribute the heat caused by the impacting electron beam better. This enables, in particular, the embodiment of X-ray emitters having greater beam intensity.

The rotating anode is conventionally rotatably mounted inside the X-ray tube by way of a sliding bearing. Sliding bearings of this kind have to ensure reliable operation, in particular mechanical contact of the rotating assembly with the non-rotating surroundings has to be avoided. Separation occurs by way of a hydrodynamic pressure build-up in a fluid lubricant which fills a lubrication gap running between an inner sliding surface and an outer sliding surface. Known in particular are laser-structured grooved ball bearings which satisfy the requirements in particular in respect of mechanical stability and decoupling. Bearings of this kind are provided with a very fine groove structure whose production by means of laser structuring is time-consuming and challenging in terms of manufacturing engineering. Furthermore, the groove structure is very susceptible to wear due to deposits of wear particles or solid phases of the lubricant.

Due to the large number of geometric influencing factors to which grooved ball bearings are generally subject, they are difficult to optimize. The complexity of the bearing geometry leads to poor predictability of bearing behavior under ideal operating conditions or those affected by wear, so a high rate of rejects results both in use and during manufacture.

Attempts at optimization have therefore been made which focus, for example, on a stochastic or deterministic variation in groove geometry, optimized filling of the bearing gap with lubricant or optimization of the wetting process between lubricant and bearing surface.

A sliding bearing having an optimized groove structure is known, for example, from the commonly assigned German published patent application DE 10 2009 048 460 A1.

Multi-sliding surface bearings are generally known, for example, from German patent DE 41 11 542 C2 or German published application DE 25 27 709 A1.

SUMMARY OF THE INVENTION

It is accordingly an object of the invention to provide an X-ray emitter which overcomes the above-mentioned and other disadvantages of the heretofore-known devices and methods of this general type and which provides for an X-ray emitter having a robust sliding bearing which satisfies the requirements in respect of adequate mechanical stability and decoupling.

With the foregoing and other objects in view there is provided, in accordance with the invention, an X-ray emitter, comprising:

a rotating anode disposed inside an X-ray tube;

a multi-sliding surface bearing rotatably mounting said rotating anode inside said X-ray tube;

said multi-sliding surface bearing having an inner sliding surface and an outer sliding surface that are mounted for rotation relative to each other about an axis of rotation and forming a gap between said inner and outer sliding surfaces;

said inner sliding surface, in a plane running perpendicular to the axis of rotation, having a contour formed at least in certain sections by arc-shaped segments that are each centered around center points arranged so as to be offset from one another.

In other words, the objects of the invention are achieved, in accordance with the invention, by providing an X-ray emitter with a rotating anode rotatably mounted inside an X-ray tube by means of a multi-sliding surface bearing. The multi-sliding surface bearing has an inner and an outer sliding surface which are mounted so they can rotate relative to each other about an axis of rotation in such a way that a gap is formed between the inner and outer sliding surfaces. A contour of the inner sliding surface in a plane running perpendicular to the axis of rotation is formed at least in certain sections by arc-shaped segments which are each centered around center points arranged so as to be offset from each other.

For rotatable mounting of the rotating anode, the invention therefore proposes a multi-sliding surface bearing (MSB) which provides the possibility of flexibly adjusting the bearing properties to particular requirements by adjusting a minimum number of geometric parameters or influencing factors. As a consequence of the relative movement between the rotating and non-rotating components of the multi-sliding surface bearing, the typically liquid lubricant which is located in the gap and adheres to the surfaces of the bearing components, is conveyed through the bearing gap. The load-bearing pressure in the lubricant is produced in regions in which the gap tapers. The sections of the gap tapering in the circumferential direction define lubricating wedge lengths which influence the hydrodynamic load-bearing behavior. The load-bearing pressure on the loading condition can be adjusted by a constructional design of the gap formed between the inner and the outer sliding surfaces. For this purpose, for example the contour of the inner sliding surface is adjusted in such a way that the gap tapers at predefined points, so a pressure profile optimized to the loading condition is established.

Compared with grooved ball bearings, the multi-sliding surface bearing of the invention has significantly fewer geometric degrees of freedom that influence the bearing behavior. The multi-sliding surface bearing can therefore meet the requirements in terms of bearing behavior much more robustly, with the production costs for the multi-sliding surface bearing being minimized in addition. Furthermore, the bearing behavior can also be calculated more easily and be predicted better theoretically owing to minimum number of influencing factors. This facilitates, in particular, the construction of specific multi-sliding surface bearings whose bearing properties are adjusted for a particular application. For example, a profile geometry, in particular the orientation of a profile of the inner and/or outer sliding surface(s) in respect of a load direction, the minimum and/or maximum height of the gap, the pitch of the profile in the circumferential direction and/or the lubricating wedge lengths can be adjusted and optimized for this purpose.

The outer sliding surface is preferably centered around the axis of rotation and at least one of the arc-shaped segments is centered around a center point which is arranged eccentrically offset in respect of the axis of rotation. In exemplary embodiments of this kind the eccentricity is a parameter which crucially determines the characteristic of the gap, in particular its profile in the circumferential direction. The eccentricity is determined here by the radial spacing of the respective center point from the axis of rotation.

In a preferred exemplary embodiment, all center points of the arc-shaped segments are arranged eccentrically offset at the same radial spacing in respect of the axis of rotation. In other words, the eccentricity of all arc-shaped segments of the inner sliding surface is identical in terms of size.

The center points of the arc-shaped segments are preferably arranged at regular angular positions circumferentially around the axis of rotation. To adjust the bearing geometry to a loading condition, symmetrical configurations inter alia are possible, wherein the arc-shaped segments extend over equally large angular ranges. The center points of the sections running eccentrically in respect of the axis of rotation and arranged at the regular angular positions predefine, in particular, the position of the locations in the circumferential direction at which the gap has a minimum and a maximum gap height.

In a development of the invention it is provided to arrange the center points arranged at regular angular positions offset from each other by an angle which matches the quotient of 360° and the number of arc-shaped segments of the inner sliding surface.

According to possible exemplary embodiments the radii of all arc-shaped segments of the inner sliding surface assume the same value. The arc-shaped segments are therefore uniformly curved, so a minimum number of factors that influence the bearing geometry is predefined.

The inner sliding surface preferably has at least two arc-shaped segments. The number of arcuate sections of the inner sliding surface is preferably relatively low, in particular less than 10 sections that are designed in this way are provided in preferred exemplary embodiments.

The inner sliding surface of the multi-sliding surface bearing runs parallel to the axis of rotation in preferred exemplary embodiments.

Other features which are considered as characteristic for the invention are set forth in the appended claims.

Although the invention is illustrated and described herein as embodied in an x-ray emitter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, which illustrate an exemplary embodiment of the invention in schematic illustration.

BRIEF DESCRIPTION OF THE SEVERAL VIEWS OF THE DRAWING

FIG. 1 shows a rotating anode rotatably mounted in an X-ray tube in a schematic sectional view;

FIG. 2 shows a multi-sliding surface bearing for mounting the rotating anode according to a first exemplary embodiment in a schematic sectional view;

Mutually corresponding parts are provided with the same reference numerals in all figures.

DETAILED DESCRIPTION OF THE INVENTION

Figure 3:
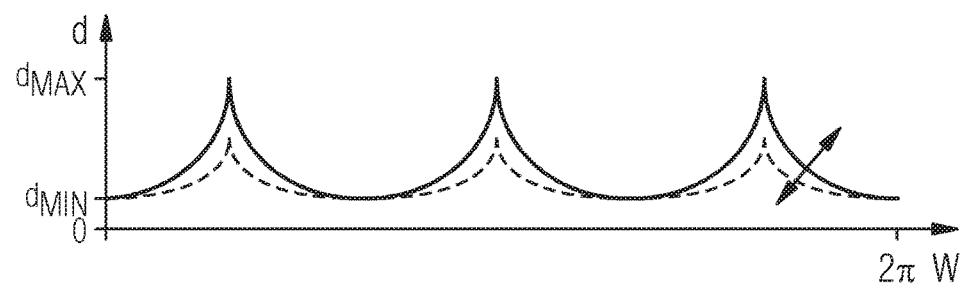
FIG. 3 shows the gap height of the first exemplary embodiment as a function of the angular position.

Referring now to the figures of the drawing in detail and first, particularly, to FIG. 1 thereof, there is shown a rotating anode 1 of an X-ray emitter 10. The anode 1 is rotatably mounted about an axis of rotation D and is illustrated in a schematic sectional view. In a manner known per se the rotating anode 1 has a target surface for impingement by with an electron beam $e^-$. During operation the rotating anode 1 is caused to rotate in order to distribute a build-up of heat that has occurred during operation over the entire surface and therefore be able to tolerate higher intensities. In the illustrated exemplary embodiment, the rotating anode 1 has a hollow shaft by which it is rotatably mounted on a fastening element 3. The fastening element 3 is arranged in a rotationally fixed manner in respect of an X-ray tube 5, which is only indicated in highly schematic form for reasons of clarity. In addition to rotatable mounting, the fastening element 3 is used for axial fixing of the rotating anode. A multi-sliding surface bearing 4 is formed between the fastening element 3 and the rotating anode 1 in the regions of the hollow shaft shown in broken lines in FIG. 1.

The multi-sliding surface bearing 4 is located inside the evacuated X-ray tube 5. Lubrication of the components guided so as to be rotatable relative to each other under high vacuum is subject to specific requirements, so suitability of a particular bearing geometry or design in this regard can only generally be defined by simulations and/or test runs.

Arranged in the region of the multi-sliding surface bearing 4 is an outer surface of the fixed fastening element 3 at the minimum radial spacing from an inner surface of the rotating hollow shaft. The outer surface of the fastening element 3 has an MSB structuring and forms an inner sliding surface 41 of the multi-sliding surface bearing 4. The one outer sliding surface 42 of the multi-sliding surface bearing 4 is formed by the inner surface of the hollow shaft. The structural design of the multi-sliding surface bearing 4, in particular the MSB structuring of the inner sliding surface 41 will be illustrated below with reference to preferred exemplary embodiments.

FIG. 2 shows the multi-sliding surface bearing 4 according to a first exemplary embodiment of the invention in a sectional view. The illustrated section runs in a plane that runs perpendicular to the axis of rotation D. The multi-sliding surface bearing 4 comprises the inner sliding surface 41 and the outer sliding surface 42. Both the inner sliding surface 41 and the outer sliding surface 42 run parallel to the axis of rotation D that runs perpendicular to the drawing plane.

The outer sliding surface 42 is circular ring-shaped. In the illustrated first exemplary embodiment the inner sliding surface 41 comprises three sections A which each have an arc-shaped profile. Formed between the inner sliding surface 41 and the outer sliding surface 42 therefore is a variable gap 43 which is filled with lubricant. Each arc-shaped segment A extends over an angular range of about 120° around the axis of rotation D.

The arc-shaped segments A have a constant radius of curvature and are centered around center points M which are eccentrically arranged in respect of the axis of rotation D. The center points M are therefore located on a circular line having radial spacing $R_{ex}$ from axis of rotation D. All sections A are arranged in the same radius $R_{kon}$ from the associated center point M in each case. The outer sliding surface 42 surrounds the inner sliding surface 41 and is formed in the manner of a circular ring having a radius $R_B$. The center points M are arranged at predefined angular positions w in respect of the axis of rotation D. In the first exemplary embodiment three sections curved in an arc-shaped manner are arranged at regular spacings from each other; the center points M respectively associated with the sections are therefore arranged offset by an angle of 120° from each other.

The eccentric arrangement of the sections A curved in an arc-shaped manner means a gap having variable gap height d is formed between the inner sliding surface 41 and the outer sliding surface 42. FIG. 3 shows the characteristic of this gap.

FIG. 3 schematically shows the gap height d of the gap 43 formed in the first exemplary embodiment as a function of the angular position w. The gap height d varies between a minimum and a maximum value. The minimum gap height $d_{MIN}$ or the maximum gap height $d_{MAX}$ is in each case assumed at three different angular positions w. The points corresponding thereto are designated by $P_{MIN}$ and $P_{MAX}$ in FIG. 1.

FIG. 3 shows with a dotted line a slightly modified design in which the ratio of the variables influencing the bearing geometry has been varied slightly. These variables are essentially predefined by the radial spacing $R_{ex}$ and the radii $R_B$ and $R_{kon}$.

Figure 4:
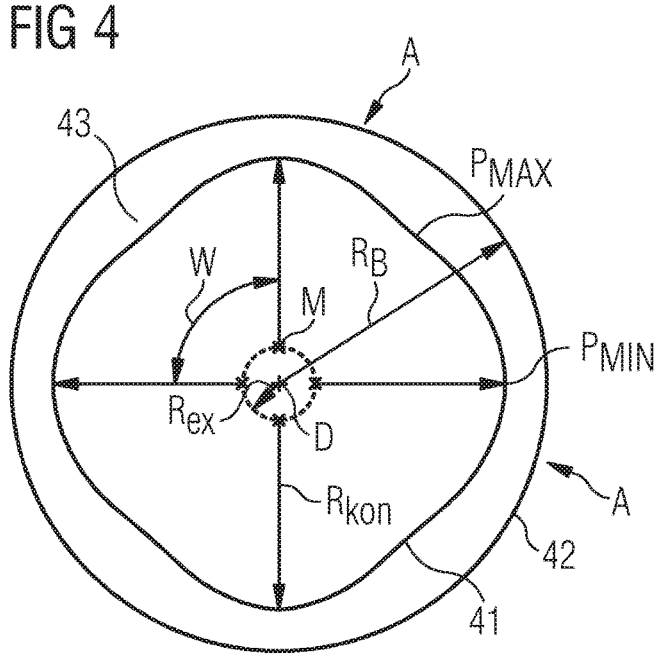
FIG. 4 shows a multi-sliding surface bearing for mounting the rotating anode according to a second exemplary embodiment in a schematic sectional view.

FIG. 4 shows a second exemplary embodiment of the invention in which the inner sliding surface 41 is formed by four arc-shaped segments A that are each arranged offset from each other by 90°. In the axial direction running perpendicular to the drawing plane extends the inner sliding surface 41 and the outer, circular ring-shaped sliding surface 42 parallel to the axis of rotation D. The sections A of the inner sliding surface 41 extend around center points M which are eccentrically arranged in respect of the axis of rotation D. The eccentricity of the arrangement is predefined by the radial spacing $R_{ex}$ which therefore assumes the same value for all sections A. Furthermore, the four arc-shaped segments A of the inner sliding surface 41 have the same radius of curvature that is predefined by the radius $R_{kon}$.

Figure 5:
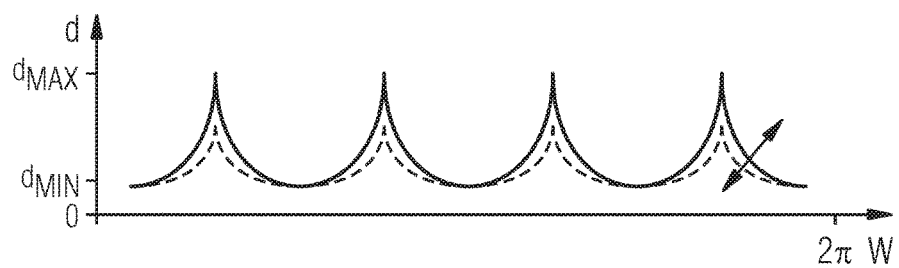
FIG. 5 shows the gap height of the second exemplary embodiment as a function of the angular position.

FIG. 5 illustrates the gap height d of the gap 43 of the second exemplary embodiment. Since in the second exemplary embodiment a total of four arc-shaped segments A is provided, the minimum gap height $d_{MIN}$ or the maximum gap height $d_{MAX}$ is assumed at a total of four angular positions w. FIG. 3 shows the points $P_{MIN}$ or $P_{MAX}$ corresponding hereto. FIG. 5 likewise shows two curves, illustrated by way of example, which correspond to different parameter values of the influencing factors predefined in terms of construction by the bearing. This essentially corresponds to the eccentricity of the arc-shaped segments A which is predefined by the value of the radial spacing $R_{ex}$ and the size of the radius $R_{kon}$ in the ratio to the radius $R_B$ of the outer sliding surface 42.

Figure 6:
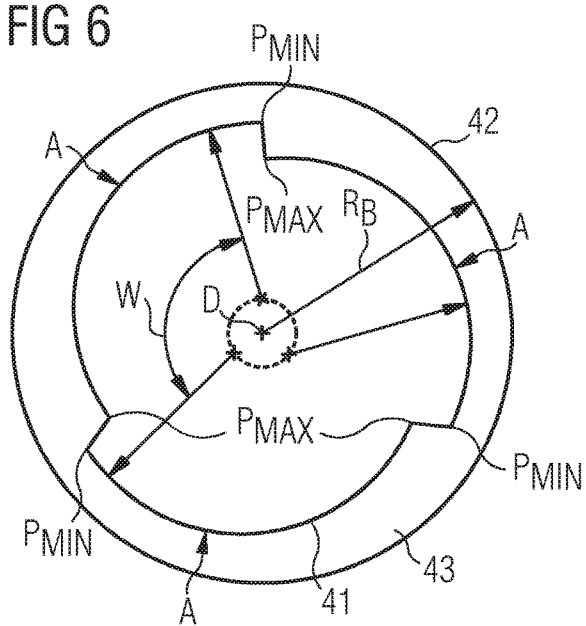
FIG. 6 shows a multi-sliding surface bearing for mounting the rotating anode according to a third exemplary embodiment in a schematic sectional view.

FIG. 6 shows a third exemplary embodiment of the invention which essentially differs from the exemplary embodiments illustrated in FIGS. 2 and 4 in that the gap is not mirror-symmetrical in design. However, the variation in the arrangement and extent of the sections A of the inner sliding surface 41, curved in an arc-shaped manner, results in the lubricating wedge lengths, i.e. the length of those gap regions in which the gap height d tapers in the circumferential direction, being significantly lengthened. The lubricating wedge lengths are, in particular, crucially responsible for generation of the hydrodynamic load-bearing pressure, so a variation of this kind enables particular adjustment to a specific loading condition.

Furthermore, the design of the third exemplary embodiment essentially matches that of the first exemplary embodiment shown in FIG. 2. In particular, the inner sliding surface 41 has a total of three sections A which are curved in an arc-shaped manner and extend parallel to the axis of rotation D. The sections A are each arranged offset from each other by 120°. Each arc-shaped segment A extends in the radius $R_{kon}$ around a center point M which is eccentrically arranged in respect of the axis of rotation D.

Figure 7:
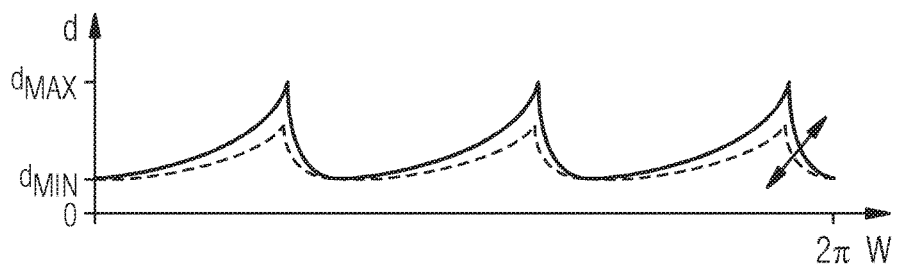
FIG. 7 shows the gap height of the third exemplary embodiment as a function of the angular position.

FIG. 7 illustrates the dependency of the gap height d of the third exemplary embodiment. The gap height d also varies here between a minimum and a maximum value. The minimum gap height $d_{MIN}$ and the maximum gap width $d_{MAX}$ are each assumed at three different angular positions w. These angular positions match the points $P_{MIN}$ and $P_{MAX}$ shown in FIG. 6. In contrast to the first two exemplary embodiments, the characteristic of the gap height d is not symmetrical. The third exemplary embodiment has a gap region here in which the gap height d changes significantly in a relatively small angular range.

Although the invention has been illustrated and described in detail with reference to the preferred exemplary embodiments, it is not limited hereby and a person skilled in the art can derive other variations and combinations herefrom without departing from the fundamental idea of the invention.

The invention claimed is:

1. An X-ray emitter, comprising:
a rotating anode disposed inside an X-ray tube;
a multi-sliding surface bearing rotatably mounting said rotating anode inside said X-ray tube;
said multi-sliding surface bearing having an inner sliding surface and an outer sliding surface that are mounted for rotation relative to each other about an axis of rotation and forming a gap between said inner and outer sliding surfaces;
said inner sliding surface, in a plane running perpendicular to the axis of rotation, having a contour formed at least in certain sections by arc-shaped segments that are each centered around center points arranged so as to be offset from one another.

2. The X-ray emitter according to claim 1, wherein said outer sliding surface is centered around the axis of rotation and at least one of said arc-shaped segments of said inner sliding surface is centered around a center point that is eccentrically offset from the axis of rotation.

3. The X-ray emitter according to claim 1, wherein all center points of said arc-shaped segments are arranged eccentrically offset at an equal radial spacing distance in respect of the axis of rotation.

4. The X-ray emitter according to claim 1, wherein the center points of said arc-shaped segments are arranged at regular angular positions circumferentially around the axis of rotation.

5. The X-ray emitter according to claim 4, wherein the center points arranged at regular angular positions are offset from each other by an angle matching a quotient of 360° divided by a number of said arc-shaped segments of the inner sliding surface.

6. The X-ray emitter according to claim 1, wherein said arc-shaped segments of said inner sliding surface have a radius and the radii of all said arc-shaped segments of said inner sliding surface assume the same value.

7. The X-ray emitter according to claim 1, wherein said inner sliding surface has at least two said arc-shaped segments.

8. The X-ray emitter according to claim 1, wherein said inner sliding surface of said multi-sliding surface bearing runs parallel to the axis of rotation.

* * * * *